US005978918A

United States Patent [19]

Scholnick et al.

[11] Patent Number: 5,978,918
[45] Date of Patent: Nov. 2, 1999

[54] SECURITY PROCESS FOR PUBLIC NETWORKS

[75] Inventors: Michael Scholnick, Baldwin; John F. Schlesinger, New York, both of N.Y.

[73] Assignee: SECURE.NET Corporation, Warrenton, Va.

[21] Appl. No.: 08/964,335

[22] Filed: Nov. 4, 1997

Related U.S. Application Data

[60] Provisional application No. 60/035,059, Apr. 17, 1997.

[51] Int. Cl.[6] ............................................. H04K 1/00
[52] U.S. Cl. ......................... 713/201; 709/229; 380/21; 380/25; 380/49
[58] Field of Search .................................. 713/201, 202; 380/21, 23, 25, 4, 48, 49; 709/225, 229

[56] References Cited

U.S. PATENT DOCUMENTS

| | | | |
|---|---|---|---|
| 5,561,770 | 10/1996 | DeBruijn et al. | 395/200.06 |
| 5,596,718 | 1/1997 | Boebert et al. | 713/201 |
| 5,717,756 | 2/1998 | Coleman | 380/25 |
| 5,732,137 | 3/1998 | Aziz | 380/25 |
| 5,774,551 | 6/1998 | Wu et al. | 380/25 |
| 5,892,902 | 4/1999 | Clark | 713/201 |

OTHER PUBLICATIONS

Copy of PCT International Search Report completed on May 11, 1998.

*Primary Examiner*—Robert W. Beausoliel, Jr.
*Assistant Examiner*—Scott T. Baderman
*Attorney, Agent, or Firm*—Smith, Gambrell & Russell

[57] ABSTRACT

A practical method and system for supplementing or replacing current security protocols used on public networks involving the distribution of a proprietary system for use on a public network access provider's network. The proprietary system includes processing hardware and proprietary software. The proprietary system transmits private data, outside the internet, over proprietary lines to a back-end process. When a "sender" sends private data it is sent over the proprietary system to a back-end process. The back-end process returns a time sensitive token which the "sender" sends to the "receiver". The "receiver" takes the time sensitive token and uses it to either retrieve the private data, over a proprietary system, or initiate a transaction with a financial institution. Encryption is used to allow authentication of the participants. This method can be used in conjunction with Secure Socket Layer (SSL) encryption and/or the Secure Electronic Transaction (SET) protocol.

17 Claims, 9 Drawing Sheets

SECURITY PROCESS FOR PUBLIC NETWORKS

This application is a continuation-in-part of U.S. provisional application 60/035,059 filed Jan. 17, 1997.

BACKGROUND OF THE INVENTION

1. Field of the Invention

The present invention relates to providing a secure manner of transferring private information between nodes on a public network. For example, if the public network was the internet, the nodes would be a public network server, the retailer, and a public network client, the consumer. More specifically, the present invention relates to conducting secure commerce over a public network. The commerce can be either the transmission and receipt of electronic data, such as software, or the processing of a payment.

2. Prior Art

The fear of having sensitive information, such as credit card numbers, stolen from a public network during transmission has impeded the growth of commerce on public networks, such as the internet. Prior methods for securing information for transmission over a public network have relied mainly on encryption, such as symmetric and asymmetric encryption algorithms, and authentication, such as Secure Socket Layer (SSL) and Secure Electronic Transaction (SET) protocols.

Symmetric encryption, or private-key encryption, such as Data Encryption Standard (DES) uses identical keys to encrypt and decrypt data. The method requires that the receiver of the encrypted data has, or will have, obtained the decryption key from the sender, or some third party. Asymmetric encryption, or public/private-key encryption, uses separate keys for encryption and decryption of data.

Authentication is used to "verify" the identity of the communication partner. This is important in electronic commerce since ensuring the identity of transaction partners is important in securing transactions. MIT's Kerberos is an example of an authentication protocol for private-key encryption. The protocol RSA, by RSA Data Security, Inc., is an example of public/private-key encryption authentication.

The problem with these security methods is that they rely completely on encryption. Past experience has proven that, when given enough time, encryption algorithms are broken. Once an encryption algorithm is broken, all past encrypted information is subject to exposure. Therefore, any process which is based solely on encryption is inherently prone to failure. Another problem with encryption is that it is CPU intensive. Transmitting large amounts of encrypted information, such as computer software, is currently not practical.

A public network, such as the internet, requires a method for overcoming the major weakness of encryption, exposure by future unauthorized decryption. In addition, a secure manner of delivering large volumes of private data is needed.

SUMMARY OF THE INVENTION

The problem of future unauthorized decryption and secure bulk transfer is solved. The present invention provides a public network with a security mechanism that prevents private information, such as a credit/debit card number or proprietary software, from being intercepted, stolen, or sniffed, off a public network infrastructure. The present invention removes the private data from the data stream being sent over a public network and replaces the information with a time sensitive token, which is encrypted. By removing the private data from the data stream, it is impossible for the private data to be intercepted off a public network. If the token was intercepted, it would become useless almost immediately since it is time sensitive. The token is encrypted to provide for proper authentication of the participants. In addition, the encryption ensures that there is not enough time for the interceptor of the token to decrypt and use the information. The private data is transmitted to a back-end system over a proprietary medium. This allows the data to be protected by means not practical, or available, over a public network. It also prevents any of the nodes on the public network from sniffing the private data. The back-end processing system acts as a mailbox for the private data. The private data can be retrieved, or an action can be instigated, by using the authorized token. In the case of credit card transaction data, the token is used to authorize the transaction processing. In the case of other private data, the token can be used to retrieve the private data over a more secure private medium.

The present invention is able to utilize current encryption protocols available over a public network. Therefore, the present invention augments the security available on a public network by removing the future exposure of the private data. In the case of a credit/debit card transaction, the present invention can also be used to provide the consumer with anonymity by shielding, from the credit/debt card company, the connection between the consumer and the retailer.

In a preferred embodiment, a request to secure private data is initiated when one node on a public network prepares to send the private data to another node on the public network. The sender contacts a proprietary application, called the private SP, on the public network access provider's system. If available, the sender encrypts the private data, and other information including both the sender's and the receiver's public encryption keys, in the receiver's public encryption key. The private SP contacts the back-end processor, the TP, and sends the encrypted private data, over a proprietary (nonpublic communication) system (nonpublic network), in exchange for a time sensitive token encrypted in the sender's public encryption key. The encrypted token is then sent back to the sender by the TP. The sender decrypts the token and encrypts it using the receiver's public key. The encrypted token is then sent to the receiver with the remaining public data. The receiver decrypts the token and, if necessary, the public data sent. After verifying the information, the receiver then encrypts the token in the TP's public key and sends the token and an action code to the TP, over a private SP, for processing. The TP receives the token and decrypts it, using the TP's private encryption key. The token is then verified to ensure that it is valid and has not expired. If the token is valid, it authenticates the receiver because only the receiver can decrypt the token as intended by the sender. If it is not expired, the TP processes the action code. In this embodiment, the TP transfers the private data to the receiver, along with the token encrypted in the TP's private key, over the private SP proprietary system. The receiver then returns an acknowledgment, encrypted in the receiver's private key, to the TP. When the TP receives the acknowledgment, it decrypts it, authenticating the receiver, discards the private data, and notifies the sender that the data transfer is complete.

In an alternative embodiment, the private data sent to the TP is not encrypted by the software. When the TP receives a valid token, the private data is sent as is to the receiver. The private data is still protected since it is only sent over proprietary (nonpublic) systems. The private SP employs hardware encryption between it and the TP.

In another alternative embodiment, the private data sent to the TP by the sender is encrypted in the TP's public key. When the TP receives a valid token, the private data is sent as is to the receiver.

In still another alternative embodiment, the process is the same as the preferred process except the action code sent to the TP, along with the token, is used to indicate that the private data be processed as a credit/debit card transaction and the private data is encrypted by the sender in the TP's public key. In this embodiment, when the TP processes the action code, by decrypting it using the TP's private key, the TP then processes the transaction with the appropriate financial institution using the private and, if necessary, the public data. The transaction completion code and the transaction authorization code, encrypted using the receiver's public key, is then sent to the receiver, along with the token, encrypted in the TP's private key. The retailer decrypts the token using the TP's public key to authenticate that is from the TP, and decrypts the authorization code using its own private key. In this embodiment, the TP can send the encrypted transaction completion code and encrypted token to the receiver over either the private SP or the public network.

In yet another alternative embodiment for a credit/debit card transaction, the transaction completion code is sent to the retailer immediately, but the transaction authorization code is sent to the retailer at a later time.

In still another alternative embodiment, private data such as software is sent. Once this is completed, an alternative way for credit/debit card processing is performed.

In another alternative embodiment, alternative credit/debit card processing is performed. Once this is completed, one of the preferred aforementioned embodiments is used to send private data, such as software.

It is important to note that any of the data packets transmitted that contain the encrypted token, instead of the private data, can be sent over the public network instead of the nonpublic network.

Non-limiting examples of encryption techniques that can be employed include digital encryption standard protocol, secure electronic transaction protocol, secure socket layer protocol, public key encryption protocol, symmetric key encryption protocol, Diffie-Hellman key agreement protocol, and the Ajtai-Dwork cryptosystem.

The nonpublic network (proprietary system) may utilize a dedicated telephone line, a private telephone line, a wireless data link, a wide area network, an optical network, a radio frequency data link, an intranet, a virtual private network, and combinations thereof.

The time stamping and expiration of the token may be synchronized with coordinated universal time and can be obtained from network time protocol, simplified network time protocol and radio frequency time broadcast signals.

DETAILED DESCRIPTION OF THE PREFERRED EMBODIMENTS

Figure 1:
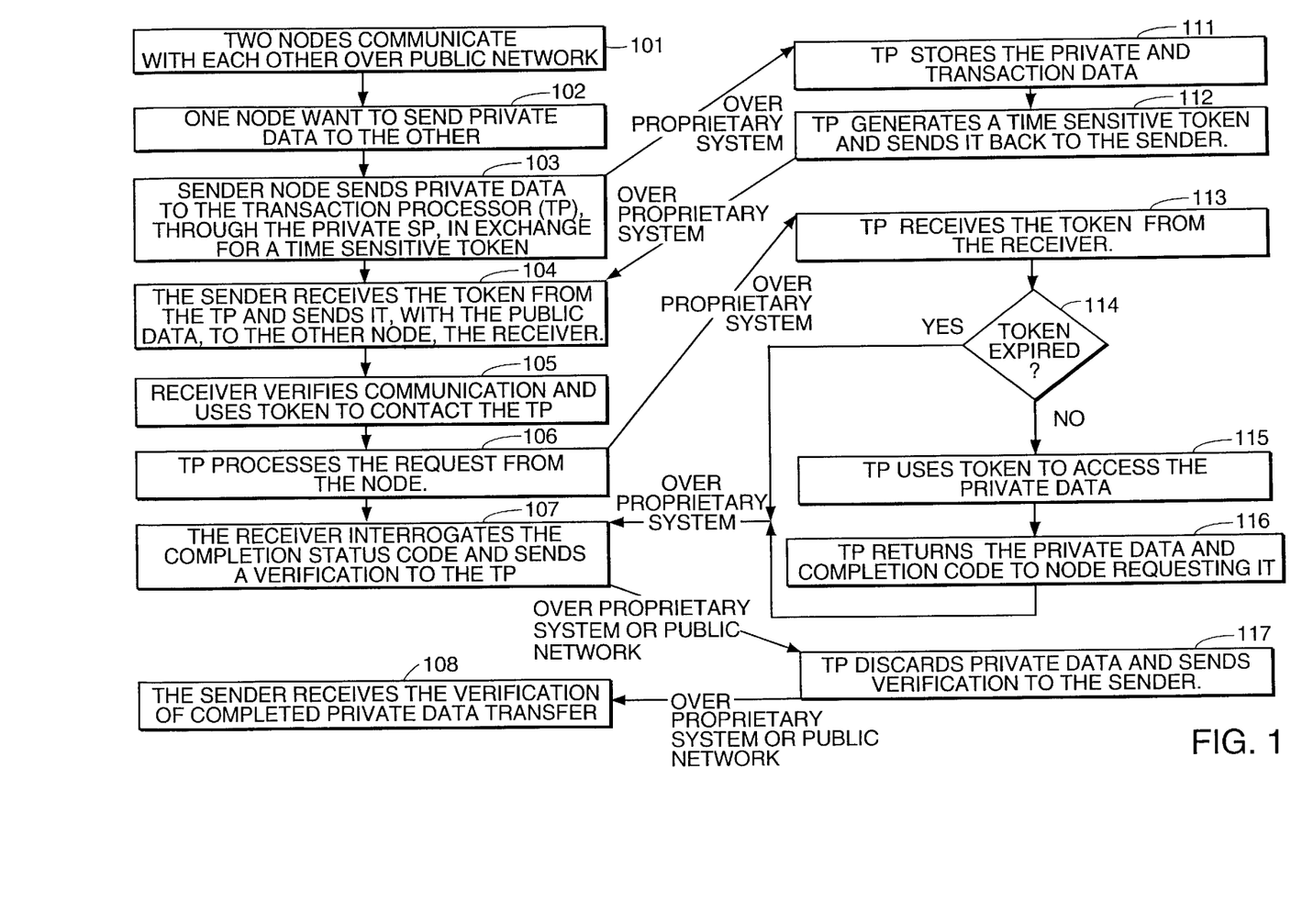
FIG. 1 is a flowchart which illustrates a general method for operation for the present invention.
Figure 2:
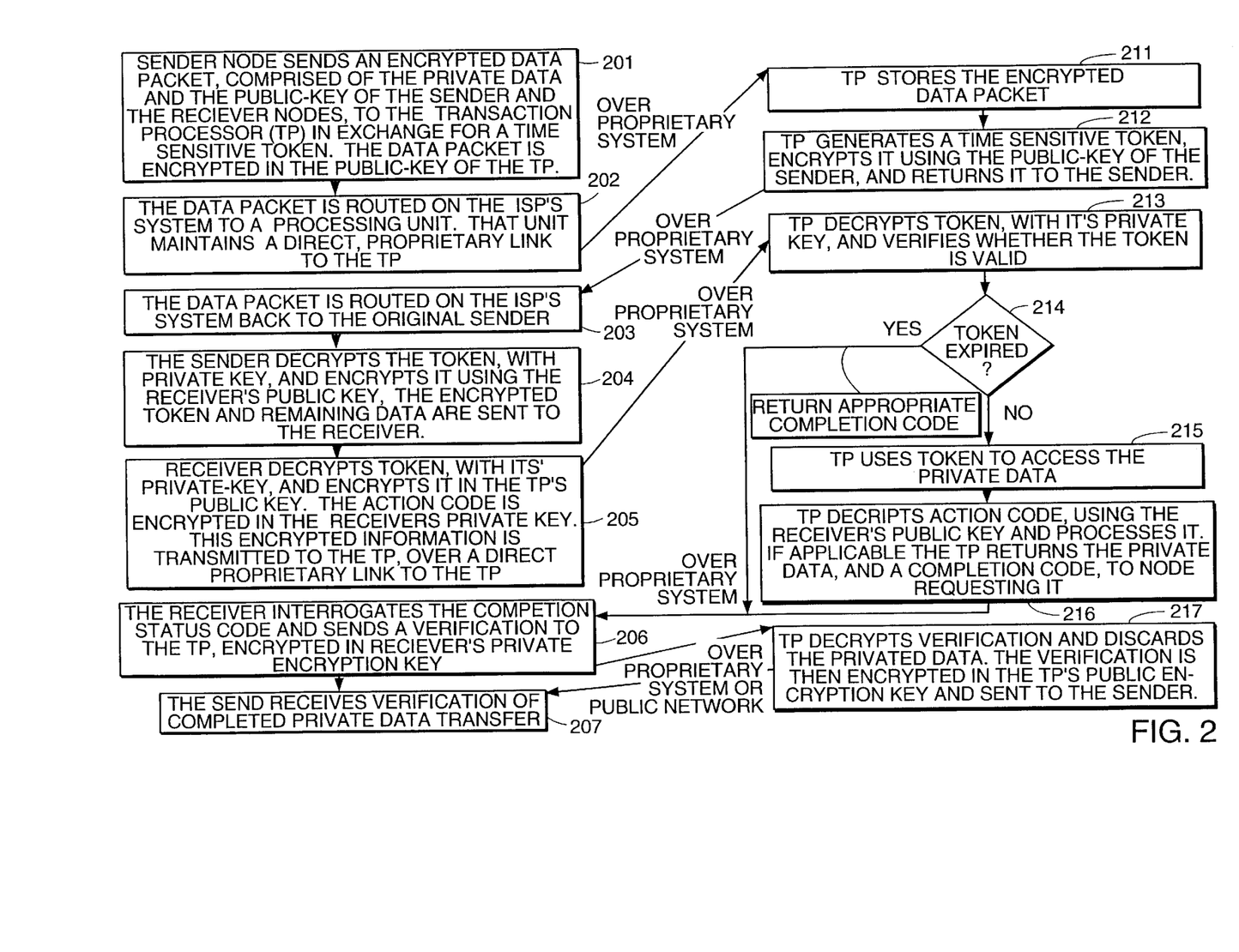
FIG. 2 is a flowchart which further illustrates operation of the present invention.

FIGS. 1 and 2 illustrate the present invention for sending electronic information, such as software or credit/debit card information (referred to as "private data"), providing the sender with a secure process which authenticates the participants, validates the transfer of information, and transmits the private data to the recipient over a different path. It is important to note that the process assumes that the encryption keys designated as private keys are in fact held in strict confidence by the party having control of them. Any correspondence that is encrypted in a sender's private key authenticates the sender's identity. In addition, any correspondence encrypted, by a sender, in a receiver's public key can only be decrypted by the intended receiver. If electronic data is encrypted, by a sender, in the intended receiver's public key and the electronic data is returned to the sender in another form, such as either clear or encrypted, in the sender's public key, the receipt of the electronic data by the intended receiver is verified.

In step 101 (FIG. 1), two nodes on a public network communicate with each other. Using the internet as an example, the two nodes are a web server, the retailer, and the web browser, the consumer. In this embodiment, both the retailer and the consumer access the public network, or internet, through an internet service provider (ISP). FIG. 1 shows the general flow of the process, while FIG. 2 provides greater detail for the process. In Step 102 (FIG. 1), the consumer requests private data to be sent from the retailer to the consumer. In step 103 (FIG. 1) the retailer transmits a private data packet to the TP in exchange for a time sensitive token. The private data packet is sent to the TP by the private SP which is a nonpublic network on the ISP's network. As indicated in step 201 (FIG. 2), the data packet is comprised of the private data and the public key of the both the retailer and the consumer. The data packet is encrypted in the public key of the TP, a back-end application. In step 202, the encrypted data is routed on the public network access provider's network to the private SP which sends it to the TP over a nonpublic network. In step 111 (FIG. 1) and 211 (FIG. 2), the TP stores the data packet and, in step 112, returns a time sensitive token to the retailer. As indicated in step 212 (FIG. 2), the TP generates the time sensitive token, encrypts it using the public key of the retailer and sends the token back to the retailer over the private SP, as in step 203. In step 104, the time sensitive token and any "public data" is sent to the consumer over the public network. As further explained in step 204, the retailer decrypts the token and then encrypts it in the consumer's public key. This authenticates, to the consumer, that the packet of information is from the retailer since only the retailer can decrypt the token from the TP. In step 105 the consumer uses the token to contact the TP for the private data. In step 205, the consumer decrypts the token, with its own private key, packages the token with information comprising an action code, encrypts it in the TP's public encryption key, and sends it to the TP over a nonpublic network. In step 106 the TP processes the request from the consumer. This is broken down into steps 113, 114, 115, and 116. In step 113 the TP receives the token from the consumer. In step 114, the TP verifies whether the token is expired. If so, a completion code indicating an expired token is sent to the consumer. In step 115, if the token is valid, the TP uses the token to access the private data. In step 116, the TP sends the private data and a completion code to the consumer.

Steps 213, 214, 215 and 216 illustrate the process in greater detail. In step 213, the TP decrypts the token, with the TP's private key. This authenticates both the retailer and the consumer since only the retailer could have decrypted the token originally sent by the TP, and the retailer encrypted the token so only the intended consumer could decrypt it. In step 214, the token is tested to determine whether it is expired, as in step 114. In step 215, the token is used to access the private data. In step 216, the TP decrypts the action code and, if applicable, the private data, encrypts it in the consumer's public key, and sends it to the consumer over a nonpublic network. In step 107 the consumer receives the private data and sends a verification to the TP. As described in step 206, the consumer receives the private data and then encrypts, in its own private key, the verification of receipt of the private data and sends it to the TP over the public network or the nonpublic network. In step 117, the TP receives the verification, discards private data, and passes the verification to the retailer over either the public network or the nonpublic network. Step 217 describes the process in greater detail, the TP receives the verification, decrypts it using the consumer's public key, authenticating the consumer, discards the private data, encrypts the verification in the TP's private key, and sends the encrypted verification to the retailer. In step 108, the retailer receives the verification and the process is complete. Step 207 shows that the retailer receives the verification and decrypts it using the TP's public key, authenticating the transaction completion.

It should be clear from the foregoing that if a person or organization intercepted the communications on the public network with the intent to store the data until the private encrypt keys became compromised, the communications would be useless because the private data is not contained in the communication. In addition, unless the private keys were immediately available for use, the token would expire prior to its ability to be used. Private key exposure can be intentional, or unintentional, by exposure of the private key or, due to either advances in technology or diligence by the interceptor, whereupon the private key(s) are broken.

It should be clear that by using a nonpublic network to transport private data, said system can employ security protocols not practical, or available, over a public network.

Figure 3:
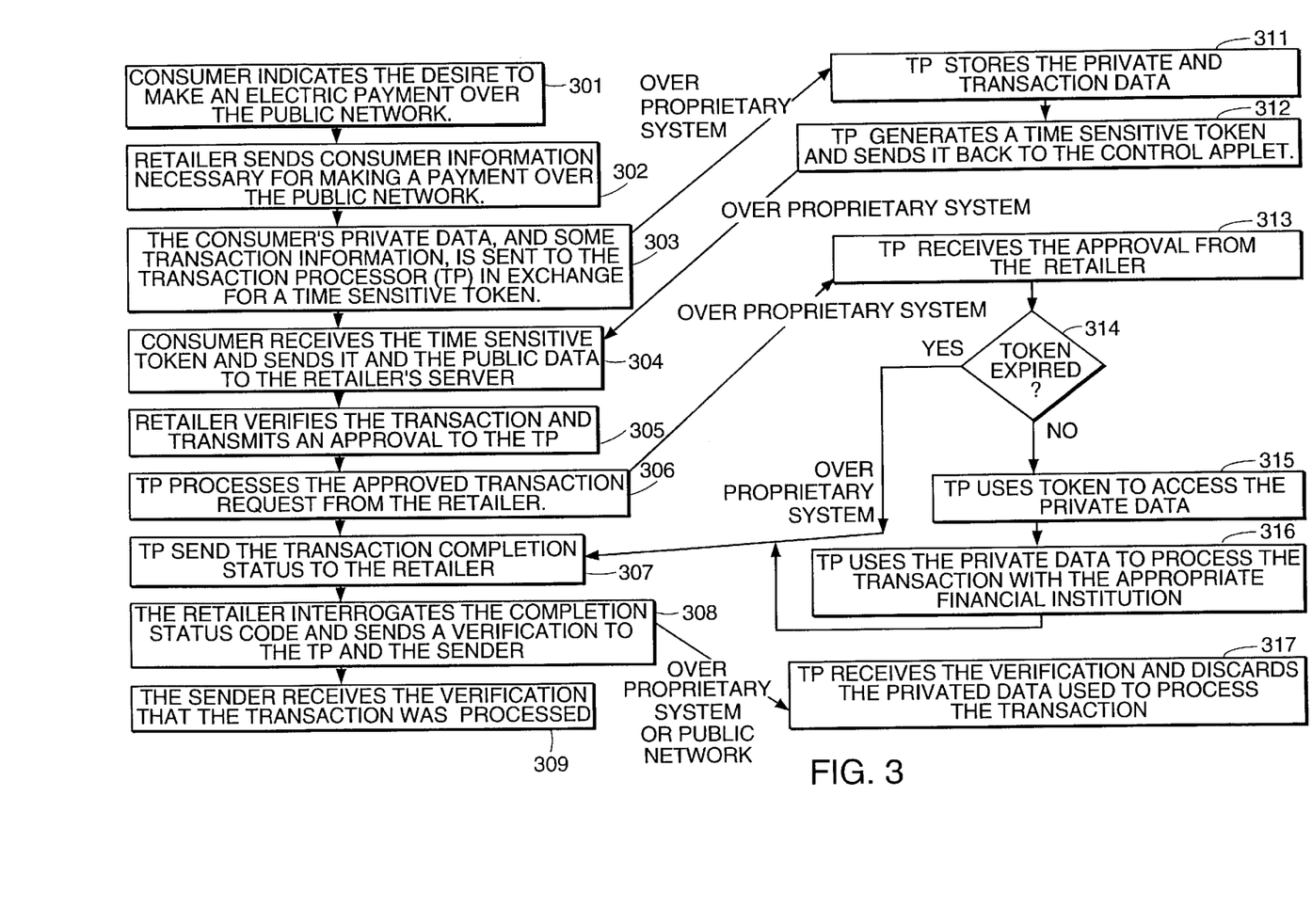
FIG. 3 is a flowchart which illustrates the present invention applied to a credit card transaction.
Figure 4:
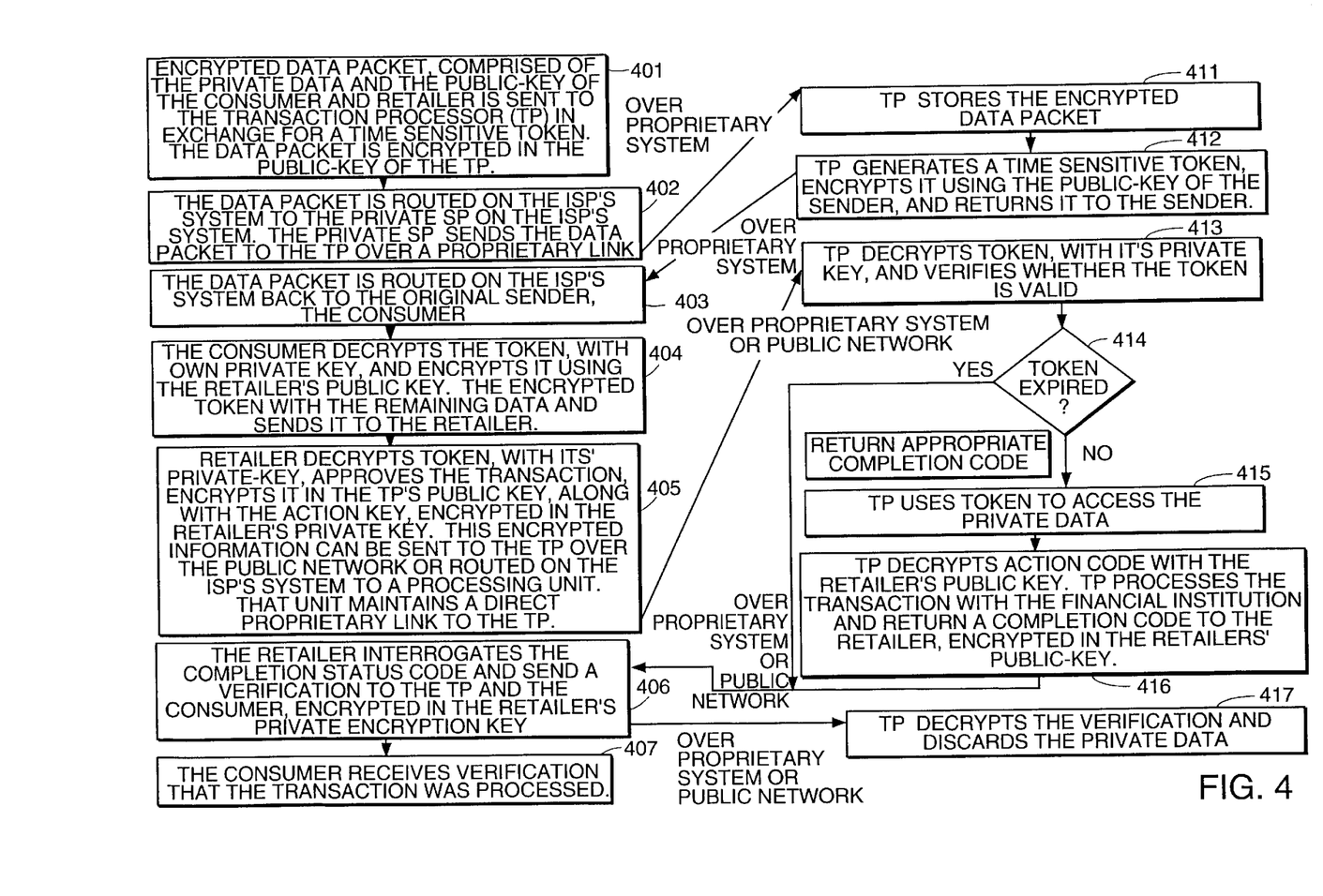
FIG. 4 is a flowchart which further illustrates the present invention applied to a credit card transaction.

FIGS. 3 and 4 illustrate an alternate embodiment where one node on a public network, the consumer, is performing a secure payment to another node, the retailer, on the public network. FIG. 3 is a general flow of the process, while FIG. 4 provides greater detail to the process.

In step 301 (FIG. 3) the consumer indicates to the retailer that a payment is to be made. In step 302, the retailer sends the consumer any information needed for the consumer to make the payment. In step 303, the consumer transmits a data packet, comprised of private data, to the TP in exchange for a time sensitive token. As indicated in step 401 (FIG. 4), the data packet is comprised of the private data, the public key of the retailer and the public key of the consumer and encrypted in the public key of the TP, a back-end application. In step 402, the encrypted data is routed on the public network access provider's network to the private SP which sends it to the TP over a nonpublic network. In steps 311 and 411, the TP stores the data packet sent by the consumer. In step 312, the TP returns a time sensitive token to the retailer. As indicated in step 412, the TP generates the time sensitive token, encrypts it using the public key of the consumer, and sends the token back to the consumer over a nonpublic network to the public network access provider's network routed, as in step 403, to the consumer.

In step 304, the consumer sends the token and any other "public data" required for the payment to the retailer. This is shown in greater detail in step 404, the time sensitive token is decrypted, with the consumer's private key, then encrypted, with the retailer's public key, and is sent with any "public data" to the retailer over the public network. In step 305, the retailer receives the data packet and verifies the information and sends the token to the TP. In step 405, the retailer is shown to decrypt the token, with the retailer's private key, approve the transaction information, encrypts the token in the TP's public key, generates an action code, encrypted in the retailer's private key, and send it to the TP. In step 306, the TP processes the approved transaction request from the retailer.

Step 313 through 316 are a general overview of this process. In step 313, the TP receives the data from the retailer. In step 314, the token is tested to determine whether it has expired. If so, the appropriate return status is sent to the retailer. If the token is valid, processing continues. It is important to note that a valid token authenticates the transaction. Only the consumer could have decrypted the token originally sent by the TP. In addition, the retailer is verified since the action code can be decrypted only with the retailer's public key. Steps 413 through 416 describe this process in greater detail. In step 413, the TP decrypts the token using the TP's private key and decrypts the action code with the retailer's public key. In step 414, the token is tested to determine whether it has expired. If so, the appropriate return status is sent to the retailer. If the token is valid, the processing continues. In step 415 the TP accesses the private data using the token. In step 416, the TP, depending on the action code, processes the transaction with the appropriate financial institution and sends the retailer the completion code, encrypted in the retailer's public key, and the original token, encrypted in the TP's private key. As described in step 307, the TP sends the transaction completion code back to the retailer. In step 308, the retailer interrogates the transaction completion code and sends a verification to the TP and the sender. In step 317, the TP receives the verification and discards the private data. In step 309 the consumer receives the verification from the retailer.

Step 406 describes this process in greater detail. The retailer decrypts the completion code, using the retailer's private key, and decrypts the token, using the TP's public key. Once complete, the retailer sends the TP and the consumer a verification encrypted in the retailer's private key. This verifies the information as coming from the TP. In step 407, the consumer receives the verification and the process is complete. Step 417 shows that the TP receives the verification and decrypts it using the retailer's public key, authenticating the transaction completion.

Figure 5:
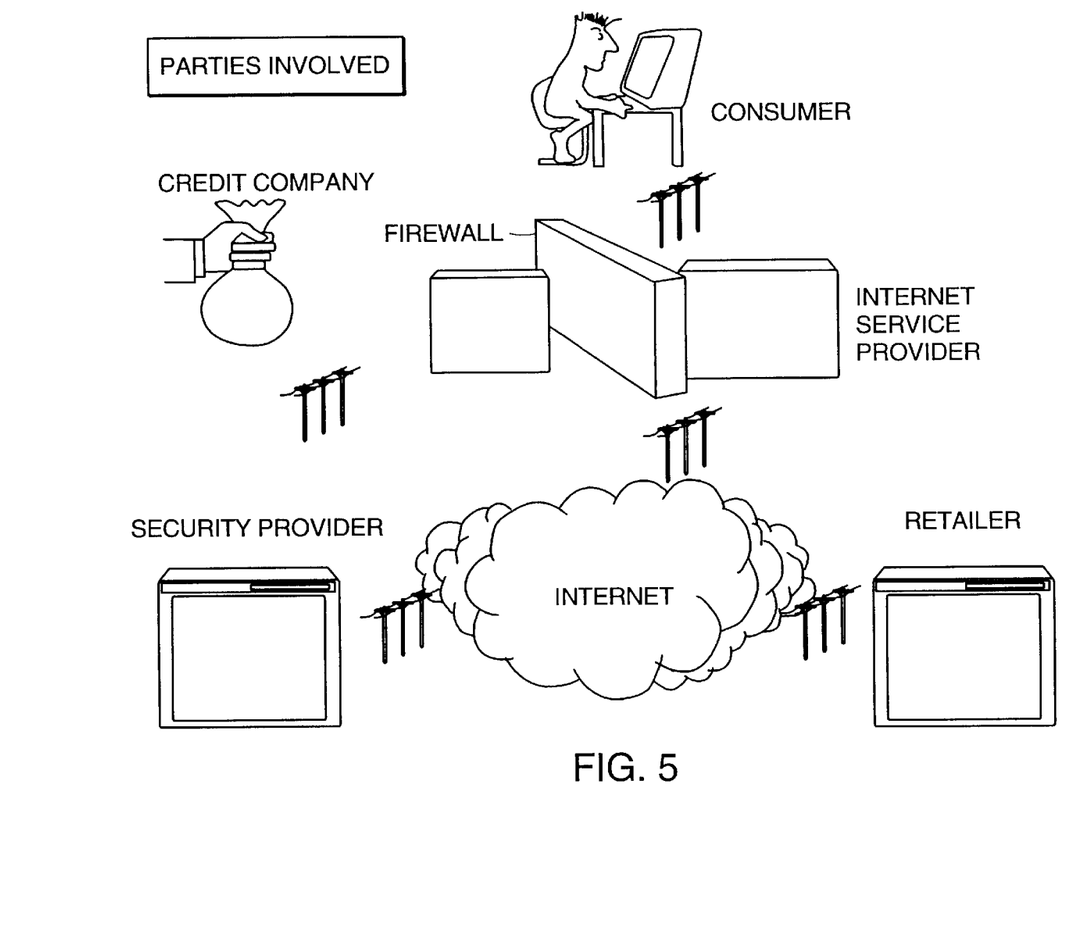
FIG. 5 illustrates the parties involved in a credit card transaction.

FIG. 5 illustrates the parties involved in the present inventive process in a credit/debit card processing embodiment. The parties include the following: the customer, the service provider, the retailer, the credit card company, and the security provider.

Figure 6:
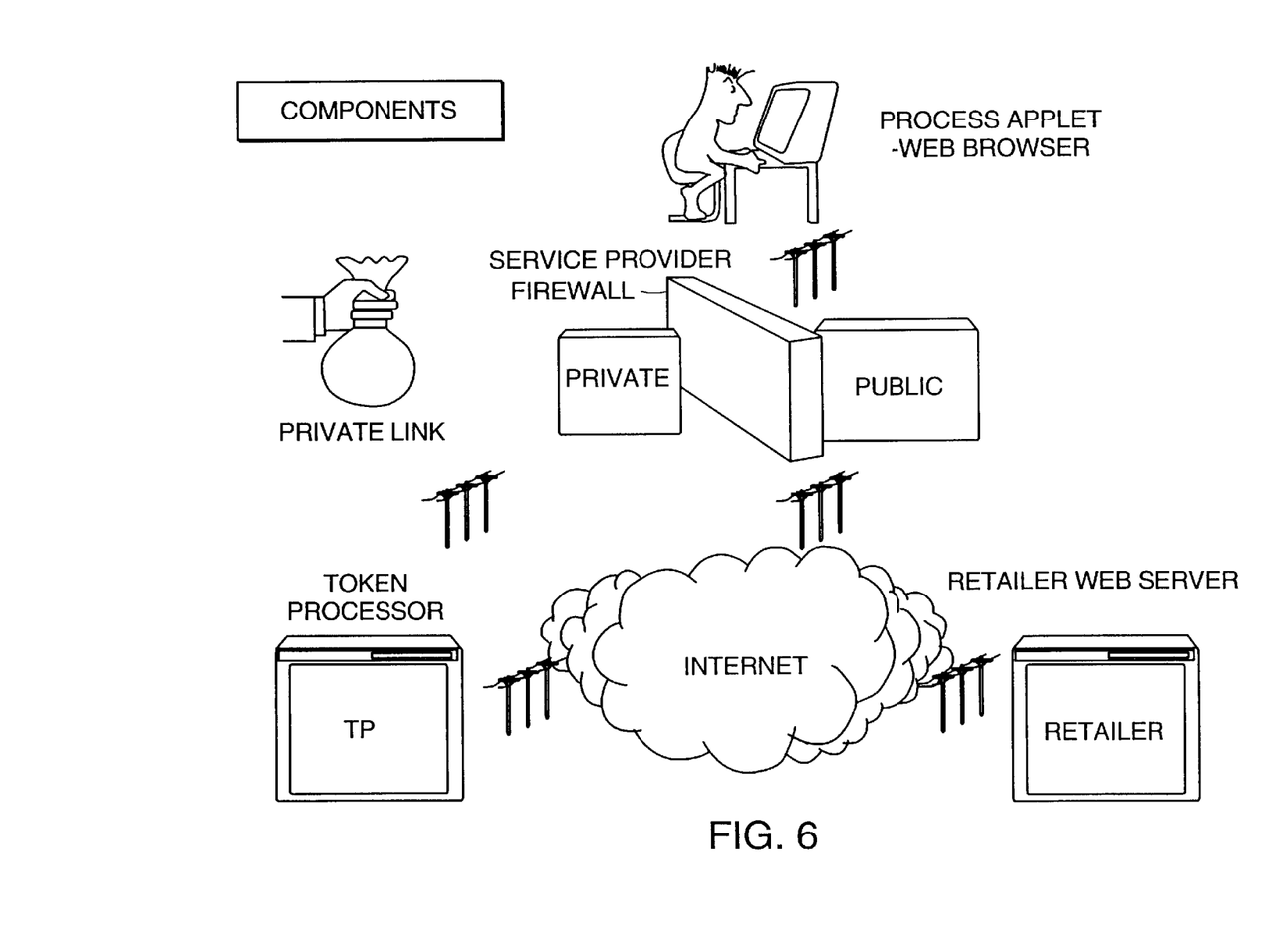
FIG. 6 illustrates the elements involved in a credit card transaction.
Figure 7:
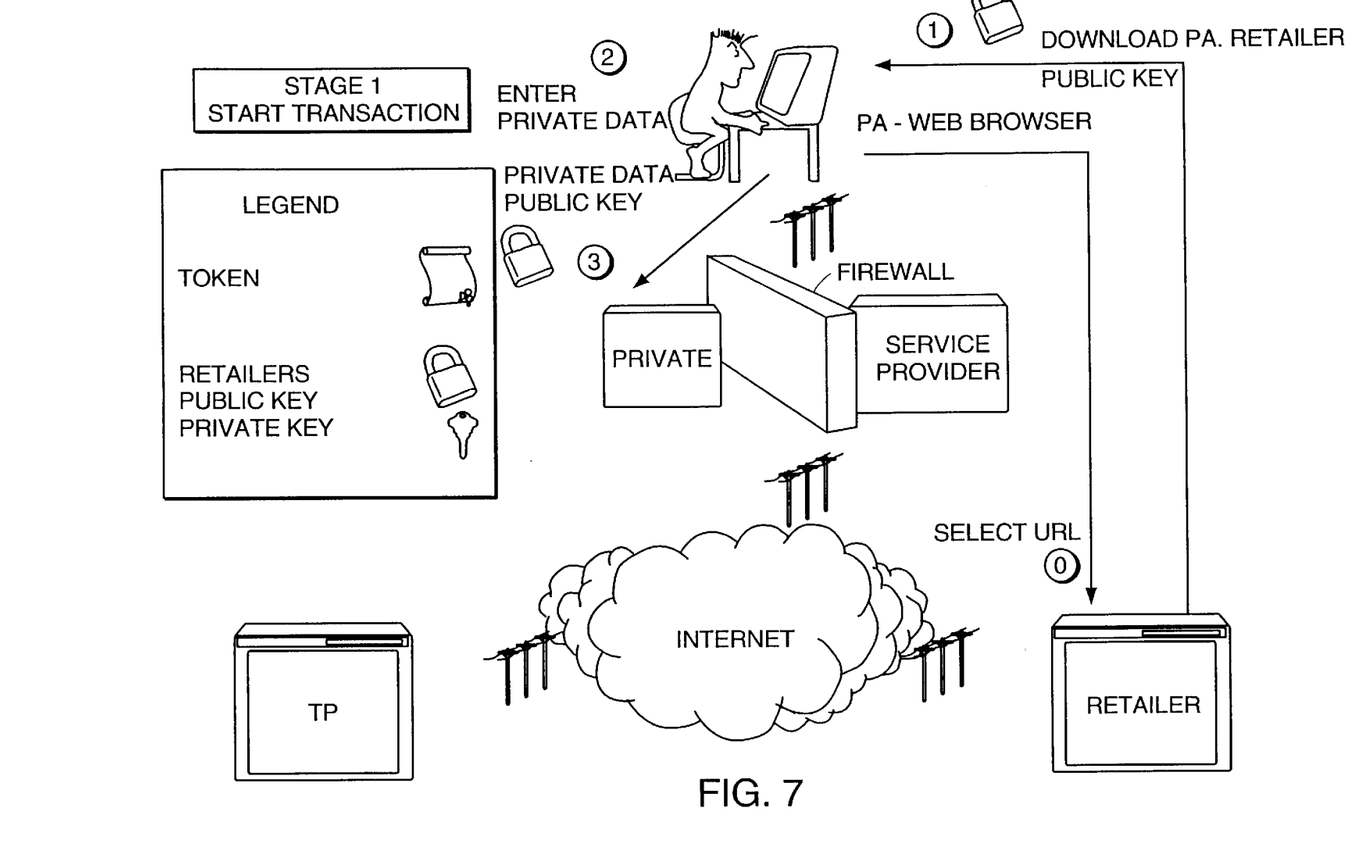
FIG. 7 illustrates the first stage of a credit card transaction.
Figure 8:
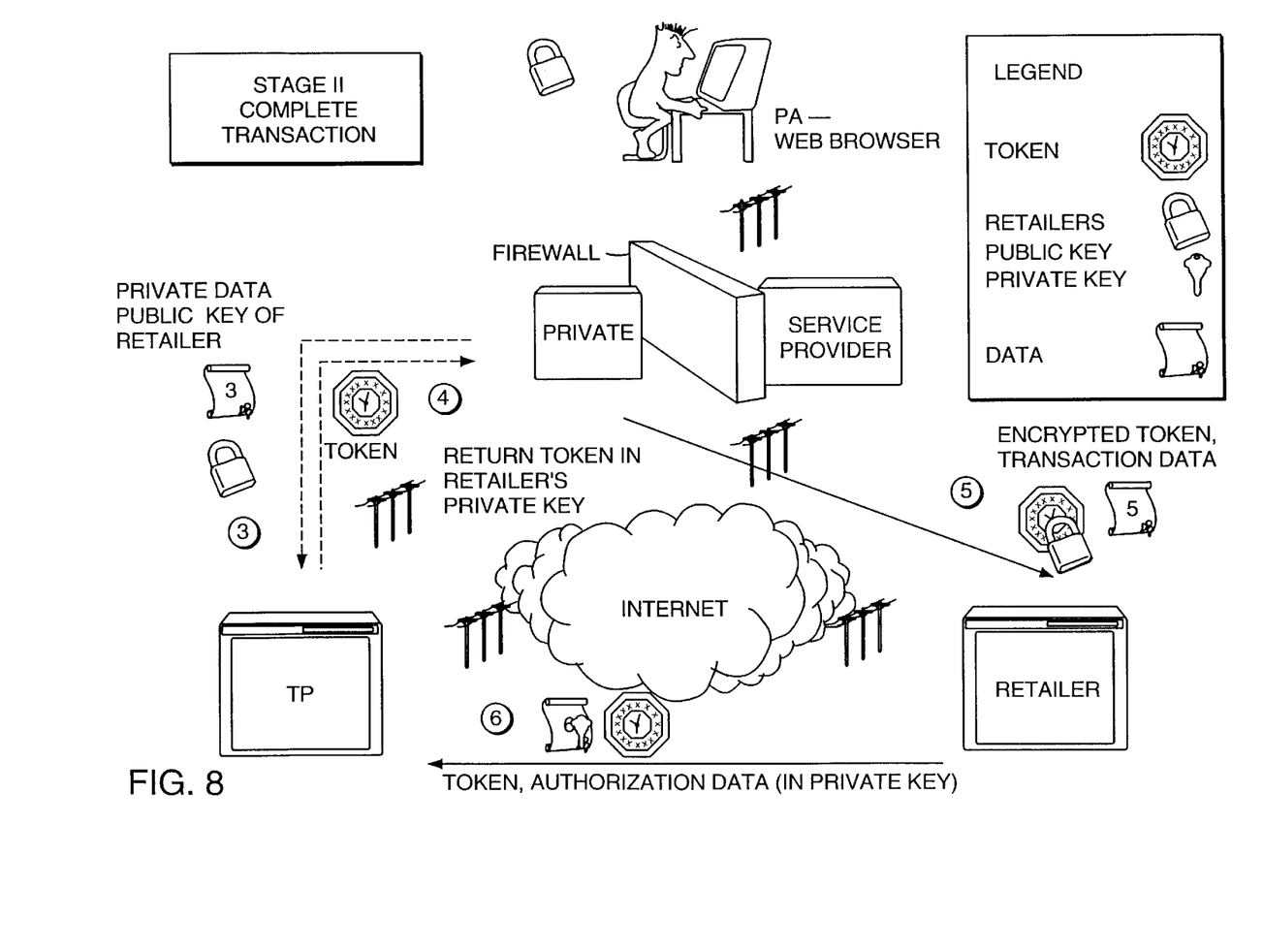
FIG. 8 illustrates the second stage of a credit card transaction.
Figure 9:
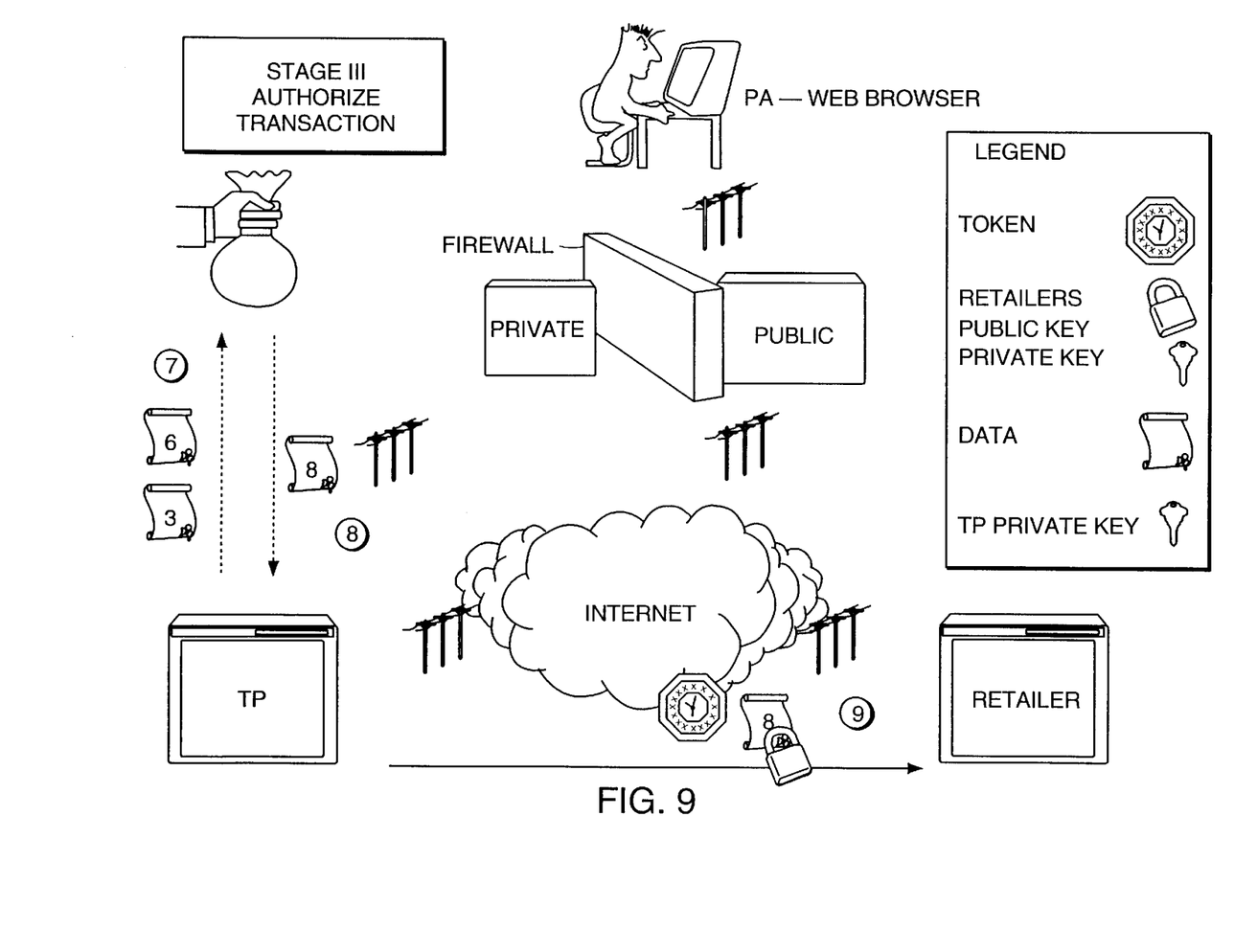
FIG. 9 illustrates the third stage of a credit card transaction.

FIG. 6 illustrates the basic elements of the present invention in the embodiment described in FIGS. 7, 8 and 9: the process applet (PA), the server, and the transaction processor (TP). The PA is the application that drives the process on the consumer's browser. There are two types of server: the service provider server (SP) and the retailer web server. The private SP resides on a public network service provider's network, and is separated from a public network by a firewall. The retailer web server is on the retailer's network, and can reside on either side of its firewall. The TP is the software that generates, coordinates, verifies and tracks tokens.

FIGS. 7, 8 and 9 illustrate the present invention in a credit/debit card transaction over the internet. FIG. 7 illustrates Stage I of the process. The process is started by the consumer requesting a URL (Universal Reference Locator) from the retailer. In step 1 (FIG. 7), the retailer returns a process applet (PA) that contains specific code, and data including the retailer's public key. The PA prompts the customer for the information required for the transaction, including the private data, such as a credit/debit card number. In step 2, the customer verifies the request and approves the transaction, and the PA attempts to contact the private SP on a public network service provider's local system. (If the private SP is not available the PA queries the customer whether it wants to continue the transaction or not. If yes, the PA transmits the customer information back to the retailer using current security protocols.) In step 3, if the SP is available, it sends the private data, and the retailer's public key to the TP. The data is sent to the TP through a secured means outside of a public network. In step 4, the TP returns a time sensitive token, encrypted in the customer's public key. In step 5, the customer decrypts the token and then encrypts it in the retailer's public key. The encrypted token is sent, with the public data, to the retailer. In step 6, the retailer now decrypts the token and uses the transaction data to verify the transaction. If all is OK, the retailer creates a request for authorization (authorization data) and sends it encrypted in the retailer's private key to the TP. The token is encrypted in the TP's public key. The TP uses the token to find the retailer's public key, and uses the public key to verify the retailer's identity and obtain the authorization data. In step 7, the TP, through a communication means outside a public network, processes the transaction with the credit company. In step 8, the credit company authorizes the transaction and sends back an authorization code to the TP. In step 9, the TP encodes the authorization code in the retailer's public key, encrypts the token in its own private key and sends them to the retailer. The retailer decrypts the token using the TP's public key to authenticate the data and decrypts the authorization code using its own private key. Although the code has been sent encrypted, it is short-lived data.

Terminology:

| | |
|---|---|
| Private Data | Data never to be sent over the public network, even encrypted. |
| Datastream | The data sent between communicating parties. |
| Consumer | The user of retailer and supplier services. |
| Internet Server | A world wide web server. |
| Internet Client | A world wide web browser. |
| Service Provider | The supplier of public network access. |
| Transaction Provider | The supplier of security services. |

We claim:

1. A transaction apparatus for securing an exchange between a sender and a receiver, the sender sending sender data that includes private data, said apparatus comprising:

a public network providing a communication medium between the sender and a receiver designated by the sender;

a local system trusted by the sender with sender data;

a transaction processor connected to the designated receiver by said public network; and a nonpublic network connecting said local system and said transaction processor, said transaction processor receiving sender data from said local system over said nonpublic network and maintaining private data thereof in strict confidence while facilitating the exchange between the sender and the designated receiver over said public network.

2. The transaction apparatus of claim 1, wherein the nonpublic network is selected from the group consisting of a dedicated telephone line, a private telephone line, a wireless data link, a wide area network, an optical network, a radio frequency data link, an intranet, a virtual private network, and combinations thereof.

3. A transaction apparatus as claimed in claim 1 further comprising a token.

4. A transaction apparatus as claimed in claim 3, wherein said token is time-sensitive.

5. A transaction apparatus as claimed in claim 4, wherein said token expires according to coordinated universal time.

6. A transaction apparatus as claimed in claim 3, wherein said token is encrypted.

7. A method of securing an exchange in a transaction conducted over a public network by a sender and a receiver designated by the sender, said method comprising the steps of:

accessing said public network to designate a receiver;

entrusting a trusted local system with sender data that includes data private to the sender;

accessing a nonpublic network that connects said trusted local system with a transaction processor trusted to maintain private data in strict confidence;

transmitting said sender data from said trusted local system to said trusted transaction processor whereby said transaction processor manages said private data in strict confidence while facilitating said transaction between the sender and the receiver.

8. A method of securing transactions as claimed in claim 7, further comprising the steps of:

at said trusted transaction processor, generating a token in response to receipt of said sender data; and transmitting said token over said public network in lieu of said sender data.

9. A method of securing transactions as claimed in claim 8, wherein said public network communicates said token to the receiver.

10. A method of securing transactions as claimed in claim 9, wherein said token is time-sensitive.

11. A method of securing transactions as claimed in claim 10, wherein said token expires according to coordinated universal time.

12. A method of securing transactions as claimed in claim 11, further comprising the step of encrypting said token.

13. A method of securing transactions as claimed in claim 7, wherein the nonpublic network is selected from the group consisting of a dedicated telephone line, a private telephone line, a wireless data link, a wide area network, an optical network, a radio frequency data link, an intranet, a virtual private network, and combinations thereof.

14. A method of securing transactions as claimed in claim 7, further comprising the step of;

encrypting said sender data prior to the step of transmitting said sender data.

15. A method of securing transactions as claimed in claim 12, wherein the step of encrypting employs a technique selected from the group consisting of digital encryption standard protocol, secure electronic transaction protocol, secure socket layer protocol, public key encryption protocol, symmetric key encryption protocol, Diffie-Hellman key agreement protocol, Ajtai-Dwork cryptosystem, and combinations thereof.

16. A method of securing transactions as claimed in claim 14, wherein the step of encrypting employs a technique selected from the group consisting of digital encryption standard protocol, secure electronic transaction protocol, secure socket layer protocol, public key encryption protocol, symmetric key encryption protocol, Diffie-Hellman key agreement protocol, Ajtai-Dwork cryptosystem, and combinations thereof.

17. A method of securing transactions as claimed in claim 11, wherein said coordinated universal time is generated by network time protocol or simple network time protocol.

\* \* \* \* \*